(12) United States Patent
Sawada

(10) Patent No.: US 8,196,173 B2
(45) Date of Patent: Jun. 5, 2012

(54) VIDEO TRANSMISSION SYSTEM AND VIDEO RELAYER DEVICE

(75) Inventor: Junichi Sawada, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 295 days.

(21) Appl. No.: 12/751,048

(22) Filed: Mar. 31, 2010

(65) Prior Publication Data

US 2010/0251319 A1    Sep. 30, 2010

(30) Foreign Application Priority Data

Mar. 31, 2009   (JP) ................................. 2009-087590

(51) Int. Cl.
*H04N 7/173* (2011.01)
*H04N 7/16* (2011.01)

(52) U.S. Cl. .............................. 725/119; 725/25; 725/31

(58) Field of Classification Search ..................... 725/25, 725/31, 119

See application file for complete search history.

(56) References Cited

U.S. PATENT DOCUMENTS

| 5,818,439 | A | * | 10/1998 | Nagasaka et al. ............... 725/87 |
| 7,529,935 | B2 | | 5/2009 | Saito |
| 2008/0108303 | A1 | * | 5/2008 | Okuda ............................. 455/7 |
| 2009/0190761 | A1 | * | 7/2009 | Tamura et al. ................ 380/270 |
| 2009/0282444 | A1 | * | 11/2009 | Laksono et al. ................ 725/89 |

FOREIGN PATENT DOCUMENTS

JP          2005-45756 A       2/2005

* cited by examiner

*Primary Examiner* — Son P Huynh
(74) *Attorney, Agent, or Firm* — Fujitsu Patent Center

(57) ABSTRACT

A video relayer device includes a processing unit and a memory. The processing unit includes: a key information transfer section to transfer first key information to a video content sink upon receiving the first key information from a video content source having a timer, and a timer pausing section to control the timer of the sink to pause upon receiving the first key information from the source. The processing unit is operable to receive second key information and a calculation result from the sink and store the same, respectively in the memory. The processing unit further includes a timer resuming section to control the timer of the source to resume when the second key information and the calculation result have been stored, respectively, in the memory.

3 Claims, 8 Drawing Sheets

VIDEO TRANSMISSION SYSTEM AND VIDEO RELAYER DEVICE

CROSS-REFERENCE TO RELATED APPLICATIONS

This application is based upon and claims the benefit of priority of the prior Japanese Patent Application No. 2009-87590, filed on Mar. 31, 2009, the entire contents of which are incorporated herein by reference.

FIELD

The present disclosure relates to video transmission system and video relayer device, for transmitting video data after authentication processing is completed.

BACKGROUND

With the recent technological advances in compression coding, cryptography, communication, and so forth, it has become common for digitized content data of movies and music pieces to be transmitted and received via networks. Since such content data are often protected by copyright, a variety of techniques have been developed for combating unauthorized devices which are likely to perform operations leading to copyright infringement such as illegal copying.

For example, in High-bandwidth Digital Content Protection (HDCP), prior to transmission or reception of content data, the validity of devices connected to an HDCP system is examined using identification information for identifying HDCP compliant devices. Once the validity is confirmed, encrypted content data is transmitted and received.

HDCP is a sort of Digital Rights Management (DRM) technique and is intended to combat unauthorized copying by encrypting output of image content and video content including high-definition television (Hi-Vision) content. More particularly, HDCP protects the last stage in the distribution process, encrypting content transmitted over digital interfaces from sources (e.g., set-top boxes, DVD players, personal computers, game consoles, etc.) to sinks (e.g., display devices such as high definition TVs, etc.).

For example, referring to FIG. 7, HDCP authentication is performed when a source (e.g., video player, digital tuner) and a sink (e.g., monitor) are connected using an High-Density Multimedia Interface (HDMI) cable or a Digital Visual Interface (DVI) cable, which transmits Hi-Vision content such as digital terrestrial broadcast content and Blue-ray disk content.

More specifically, as illustrated in FIG. 8, after receiving key selection vector (KSV) of the source (AKSV), the sink has to calculate an R0' value within a desired time, e.g., 100 ms, from the time that the source finishes writing (sending) its AKSV to the sink. For the source, after receiving BSKV, it is necessary to calculate an R0 value within 100 ms from the time that the sink writing (sending) its key selection vector (BKSV) to the source.

Thus, the R0 value and the R0' value are compared 100 ms+αlater than the time when the source wrote (sent) its AKSV (a is an estimated time period, such as a few milliseconds, from AKSV writing to BKSV reception). In this way, authentication is completed.

Meanwhile, in the above case, the physical distance between the source (e.g., video player, digital tuner) and the sink (e.g., monitor) connected by an HDMI cable or a DVI cable is very short. However, along with the widespread use of home LANs (local area networks) and IPTV (Internet Protocol television) systems, there are more occasions where the distances between sources and sinks are extended by transmission media such as an IP (Internet Protocol) network.

For example, in a case where a Digital Living Network Alliance (DLNA) network is constructed using a home LAN or where an in-house video delivery system is designed, an arrangement illustrated in FIG. 9 may be employed. In this arrangement, video data is converted into IP packets using a video relayer device to make it possible to transmit the video data using an IP network regardless of the distance between a source and a sink. There are techniques developed for transmitting video data using networks.

SUMMARY

According to an aspect of the invention, a video relayer device includes a processing unit and a memory. Such a processing unit includes: a key information transfer section to transfer first key information to a video content sink upon receiving the first key information from a video content source having a timer, and a timer pausing section to control the timer of the sink to pause upon receiving the first key information from the source. The processing unit is operable to receive second key information and a calculation result from the sink and store the same, respectively, in the memory. The processing unit further includes a timer resuming section to control the timer of the source to resume when the second key information and the calculation result have been stored, respectively, in the memory.

Advantages of the invention will be realized and attained via the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

In the following, a video relayer device and a video transmission system according to example embodiments of the invention will be described in detail with reference to the accompanying drawings.

First Embodiment

In the following, configurations and processing procedures of a video transmission system and a video relayer device according to a first embodiment of the invention will be described, and then effect achieved by the first embodiment will be described.

Figure 1:
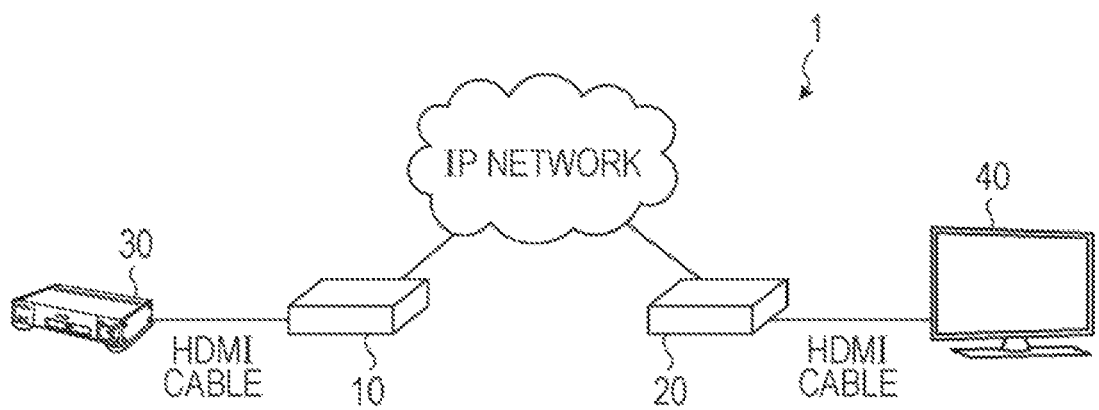
FIG. 1 illustrates a video transmission system according to a first embodiment of the invention.

FIG. 1 illustrates a video transmission system according to a first embodiment of the invention. As illustrated, the video transmission system 1 includes a source 30 of video content, e.g., an HDD (hard disk) recorder, a sink 40 for video content, e.g., a monitor, a video relayer device 10 provided at the side of the source ("src-side"), and a video relayer device 20 provided at the side of the sink ("snk-side").

In the video transmission system 1, the relayer device 10 at the src-side and the video transmission device 20 at the snk-side are connected via an IP (Internet Protocol) network. The video relayer device 10 and the source 30 are connected by an HDMI cable, and the video relayer device 20 and the sink 40 are connected by an HDMI cable.

The video relayer device 10 sends the video relayer device 20 a video signal and an audio signal received from the source 30. The video relayer device 10 also sends the source 30 a hot-plug signal indicating completion of connection to the sink 40, a key selection vector of the sink 40 (BKSV, second key information) which is information associated with keys held by the sink, and an R0' value (calculation result) each of which are to be transmitted from the video relayer device 20. The R0' value is a value calculated by the sink 40. In addition, the video relayer device 10 sends the video relayer device 20 a key selection vector of the source 30 (AKSV, first key information) which is information associated with keys held by the source and to be transmitted from the source 30.

The video relayer device 20 sends the sink 40 a video signal and an audio signal received from the video relayer device 10. The video relayer device 20 also transfers to the sink 40 the AKSV transmitted from the video relayer device 10 and transfers to the video relayer device 10 a hot-plug signal, the BKSV, and the R0' value transmitted from the sink 40.

The source 30 stores video data and audio data in a hard disk, and after HDCP authentication is completed, transmits video signals and audio signals to the sink 40 via the video relayer device 10 and the video relayer device 20. The source 30 also holds the AKSV which is information associated with keys. In addition, the source 30 is provided with a timer to be started upon reception of the BKSV from the sink 40, so as to calculate an R0 value using the BKSV within a desired time, e.g., 100 ms, after BKSV reception.

Upon completion of HDCP authentication, the sink 40 outputs the video signal and audio signal received from the source 30. The sink 40 holds the BKSV, which is information associated with keys of the sink. The sink 40 sends a hot-plug signal to the video relayer device 20 when connection with the source 30 is completed. The sink 40 calculates the R0' value using the AKSV received from the source 30.

Figure 2:
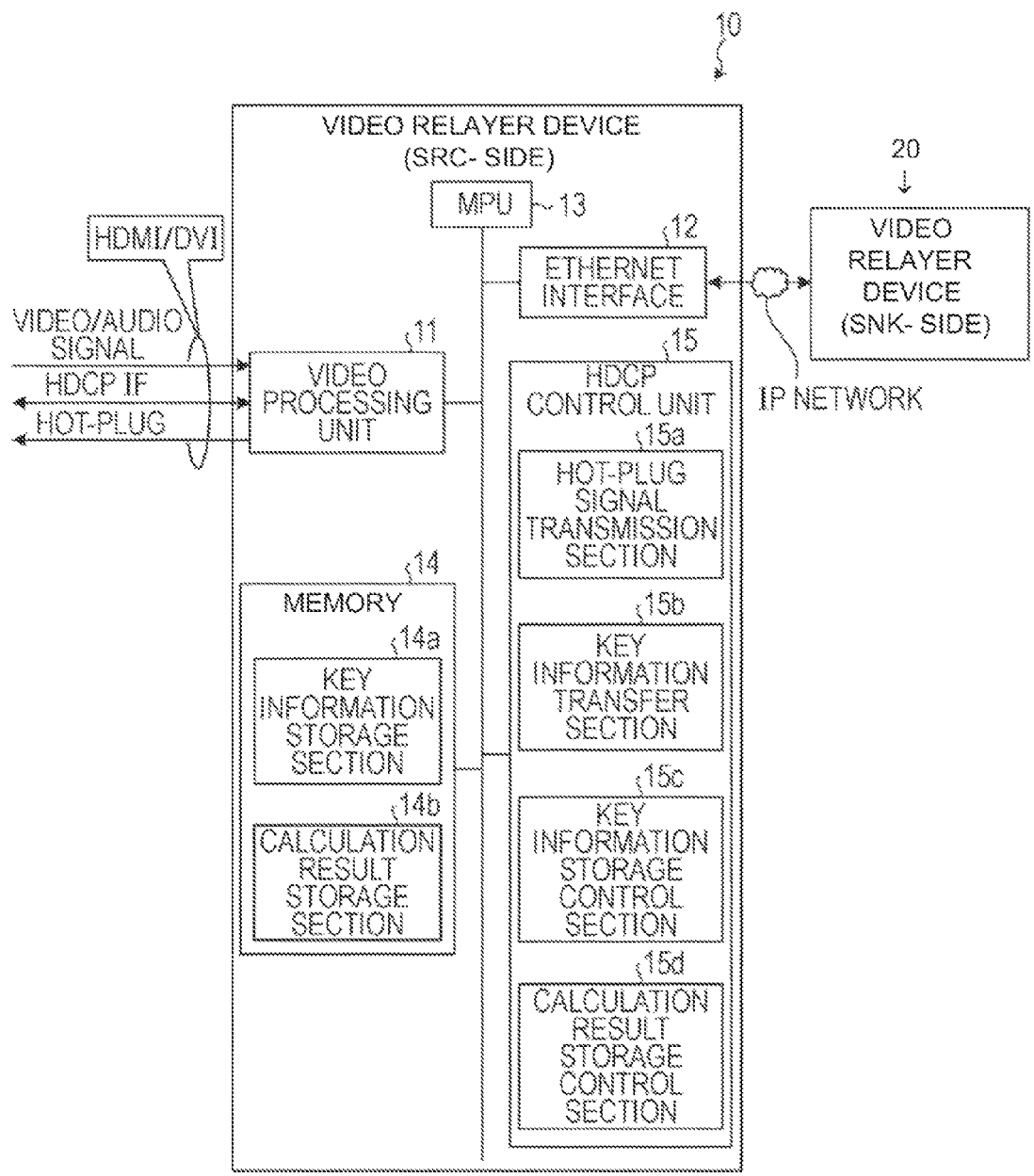
FIG. 2 is a block diagram illustrating a configuration of a video relayer device (at the src-side) according to the first embodiment.
Figure 3:
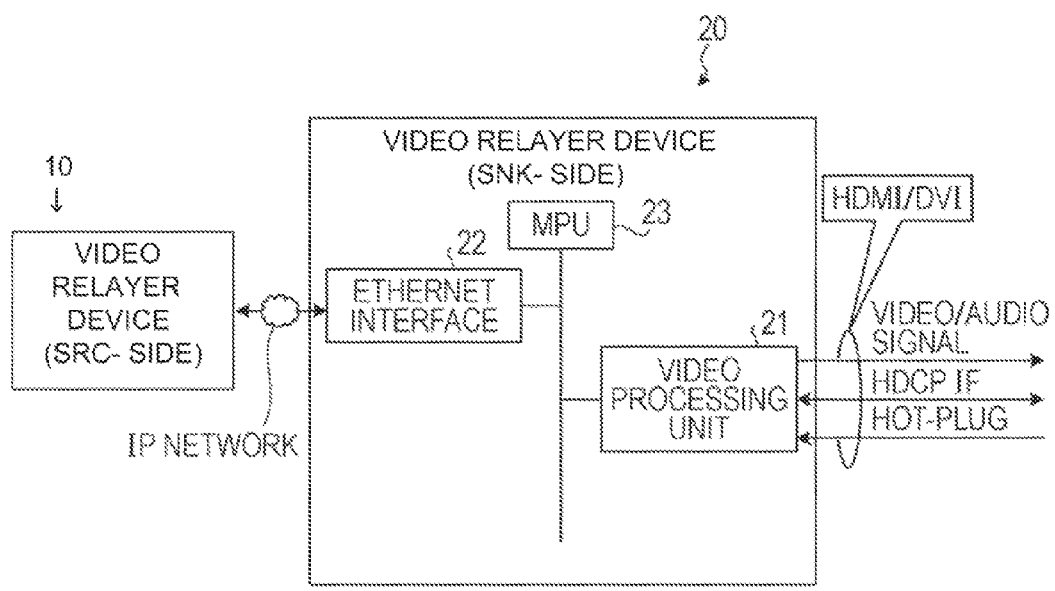
FIG. 3 is a block diagram illustrating a configuration of a video relayer device (at the snk-side) according to the first embodiment.

Referring now to FIG. 2 and FIG. 3, configurations of the video relayer device 10 provided at the src-side and the video relayer device 20 provided at the snk-side as illustrated in FIG. 1 will be described. FIG. 2 illustrates a configuration of the video relayer device 10 according to the first embodiment. FIG. 3 illustrates a configuration of the video relayer device 20 according to the first embodiment.

As illustrated in FIG. 2, the video relayer device 10 has a video processing unit 11, an Ethernet interface 12, an MPU (microprocessing unit) 13, a memory 14, and an HDCP control unit 15. The video relayer device 10 is connected to the video relayer device 20 via an IP network and connected to the source 30 by an HDMI cable or a DVI (digital visual interface) cable. In the following, operations of the above components will be described.

The video processing unit 11 receives a video signal and an audio signal transmitted from the source 30 and then converts the video signal and audio signal into IP packets to be sent to the Ethernet network 12. The MPU 13 has an internal memory for storing a program describing various processing procedures and required data, thereby executing various processing.

The Ethernet interface 12 controls communication with an Ethernet network and controls communication of various information to be exchanged with other devices connected to the network, such as the video relayer device 20. Specifically, the Ethernet interface 12 sends the video relayer device 20 video data and audio data in the form of IP packets received from the video processing unit 11.

The storage unit 14 stores data and programs necessary for various processing performed by the HDCP control unit 15. In particular, the storage unit 14 has a key information storage section 14a and a calculation result storage section 14b.

The key information storage section 14a stores a BKSV which is information associated with keys held by the sink 40 (the KSV of the sink 40). More specifically, the key information storage section 14a temporarily stores the BKSV received from the video relayer device 20.

The calculation result storage section 14b stores an R0' value calculated by the sink 40. Specifically, the calculation result storage section 14b temporarily stores the R0' value that has been calculated by the sink 40 using the AKSV which is information associated with keys held by the source (the KSV of the source 30) and received from the video relayer device 20.

The HDCP control unit 15 has an internal memory for storing a program describing various processing procedures and required data, thereby executing various processing relating to HDCP. In particular, the HDCP control unit 15 has a hot-plug signal transmission section (timer pausing section, timer starting section) 15a, a key information transfer section 15b, a key information storage control section 15c, and a calculation result storage control section 15d.

The hot-plug signal transmission section (timer pausing section, timer resuming section) 15a, upon receiving the AKSV from the source 30, notifies the source 30 that the source 30 and the sink 40 are not connected (turns off the hot-plug signal) to pause the timer of the source 30.

When the BKSV is held by the key information storage section 14a and also when the R0' value is held by the calculation result storage section 14b, the hot-plug signal transmission section 15a transmits a hot-plug signal to the source 30 to restart the timer of the source 30.

Specifically, upon receiving a hot-plug signal from the video transmission device 20, the hot-plug signal transmission section 15a sends the source 30 the hot-plug signal for pre-authentication to cause the source 30 to send the AKSV.

The hot-plug signal transmission section 15a, upon being notified by the key information transfer section 15b of the reception of the AKSV, turns off the hot-plug signal to the source 30 temporarily to suspend the connection between the source 30 and the sink 40. The hot-plug signal transmission section 15*a*, upon being notified by the calculation result storage control section 15*d* that the R0' value has been received, transmits the hot-plug signal again to the source 30.

Upon receiving the AKSV, the key information transfer section 15*b* transfers the received AKSV to the sink 40. Specifically, upon receiving the AKSV from the source 30, the key information transfer section 15*b* transfers the AKSV to the video transmission device 20. Then, the key information transfer section 15*b* notifies the hot-plug signal transmission section 15*a* of the reception of the AKSV.

The key information storage control section 15*c*, upon receiving the BKSV from the video transmission device 20, performs control to store the received BKSV in the key information storage section 14*a*. Then, the key information storage control section 15*c* notifies the hot-plug signal transmission section 15*a* of the reception of the BKSV.

The calculation result storage control section 15*d*, upon receiving the R0' value from the video relayer device 20, performs control so that the received R0' value is stored in the calculation result storage section 14*b*. Then, the calculation result storage control section 15*d* notifies the hot-plug signal transmission section 15*a* of the reception of the R0' value.

Referring now to FIG. 3, the video relayer device 20 at the snk-side includes a video processing unit 21, an Ethernet interface 22, and an MPU 23. The video relayer device 20 is connected to the video relayer device 10 provided at the src-side via the IP network and is connected to the sink 40 by an HDMI cable (or DVI cable). In the following, operations of the individual components mentioned above will be described.

The video processing unit 21 receives IP packets transmitted from the video relayer device 10. The video processing unit 21 extracts audio data and video data from the received IP packets and transmits the audio data and video data to the sink 40. The video processing unit 21 converts data into IP packets and transmits the IP packets to the Ethernet interface 22. The MPU 23 has an internal memory for storing a program describing various processing procedures and required data, thereby executing various processing.

Figure 4:
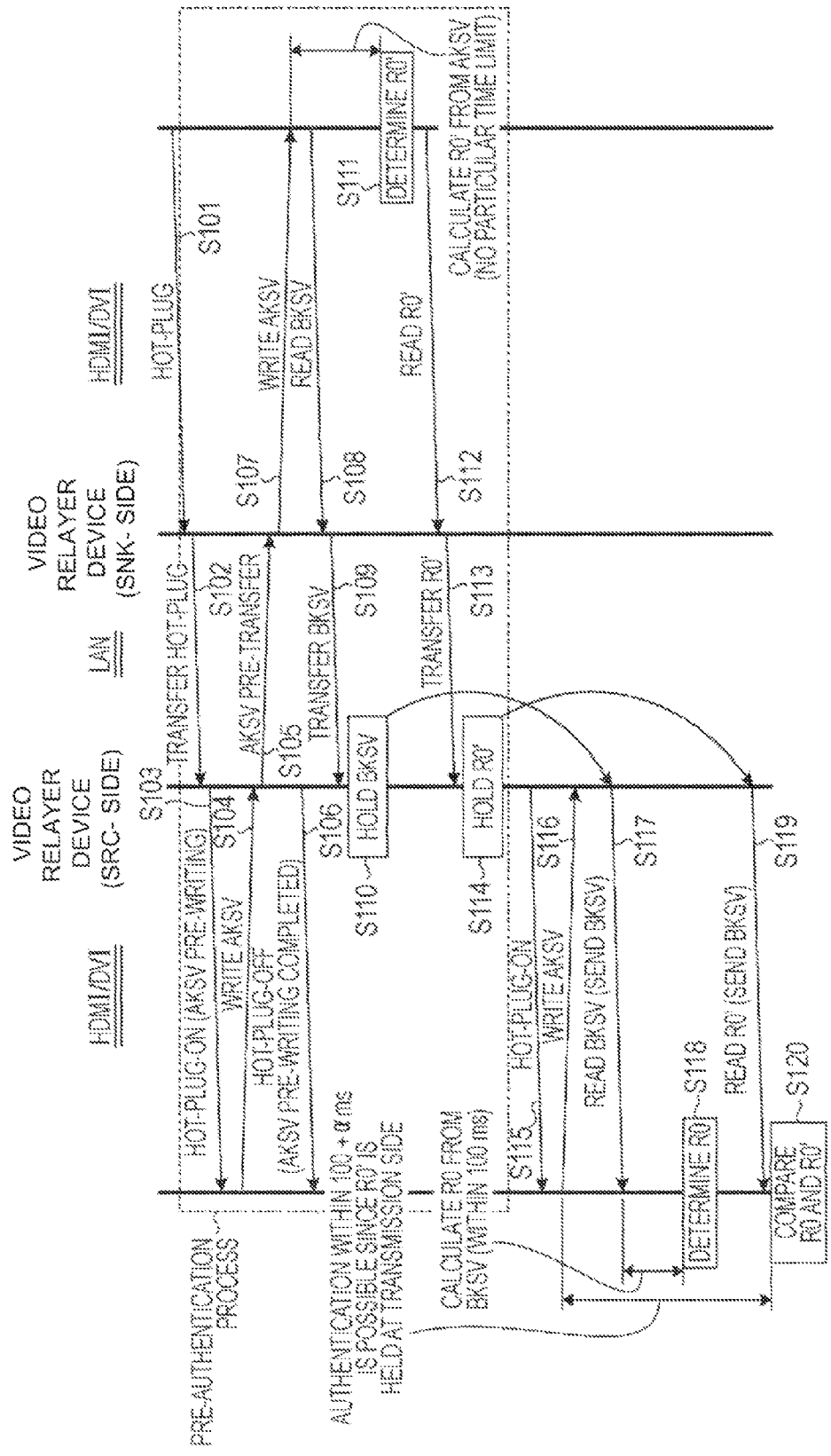
FIG. 4 is a sequence diagram illustrating a procedure of authentication processing performed by a video transmission system according to the first embodiment.
Figure 5:
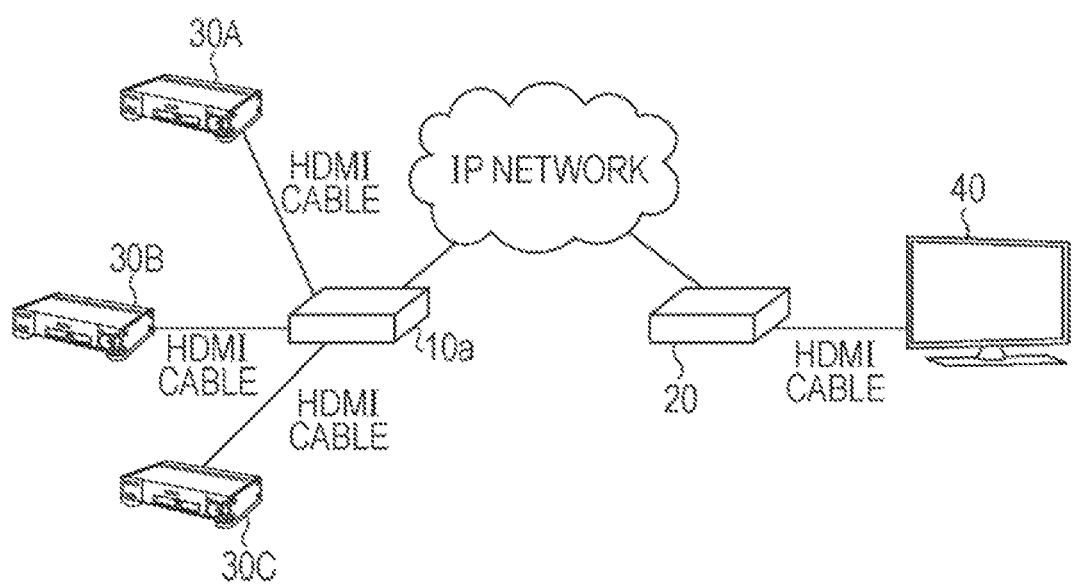
FIG. 5 is a block diagram illustrating a configuration of a video transmission system according to a second embodiment of the invention.

Referring to FIG. 4, a procedure of processing performed by the video transmission system 1 according to the first embodiment will be described. FIG. 4 is a sequence diagram illustrating a procedure of authentication processing performed by the video transmission system 1 according to the first embodiment.

As illustrated in FIG. 4, the sink 40 in the video transmission system 1 sends the video relayer device 20 a hot-plug signal indicating completion of connection (Step S101). The video relayer device 20 transfers the hot-plug signal to the video relayer device 10 (Step S102).

The video relayer device 10 transmits the hot-plug signal for pre-authentication (Step S103) to cause the source 30 to transmits the AKSV (Step S104).

The video relayer device 10 transfers the AKSV to the video relayer device 20 (Step S105) and temporarily turns off the hot-plug signal to the source 30 to suspend the connection to the sink 40 (Step S106).

Then, the video relayer device 20 transmits the AKSV to the sink 40 (Step S107) and receives the BKSV from the sink 40 (Step S108). The video relayer device 20 transfers the BKSV to the video relayer device 10 (Step S109).

The video relayer device 10 temporarily stores the received BKSV (Step S110). The sink 40 calculates and determines the R0' value using the received AKSV (Step S111) and transmits the R0' value to the video relayer device 20 (Step S112). The video relayer device 20 transfers the received R0' value to the video relayer device 10 (Step S113).

The video relayer device 10 temporarily stores the received R0' value (Step S114). Subsequently, the video relayer device 10 sends the hot-plug signal again to the source 30 (Step S115).

The video relayer device 10 receives the AKSV (Step S116) and in return sends the stored BKSV to the source 30 (Step S117). The source 30 calculates and determines the R0 value using the received BKSV (Step S118) and then reads the R0' temporarily stored in the video relayer device 10 (Step S119).

The source 30 performs HDCP authentication, in which it is determined whether or not the R0 value and the R0' value coincide (Step S120). Specifically, in the video transmission system 1, the video relayer device 10 at the scr-side turns off the hot-plug signal to the source 30 to pause the timer of the source 30. Then, after holding the BKSV and the R0' value, the video relayer device 10 sends the hot-plug signal again to the source 30.

Consequently, in the video transmission system 1, the time necessary for data exchange via the IP network can be provided independently of the time set in the timer (e.g., 100 ms). Thus, the comparative calculation of the R0 and R0' values can be performed within 100+α ms from the time that the source 30 transmits the AKSV. This makes it possible to successfully perform authentication even when delay occurs due to the presence of another physical medium between the source 30 and the sink 40.

As described above, in the video transmission system 1, the video relayer device 10, upon receiving the AKSV from the source 30, transfers the AKSV to the sink 40 and at the same time pauses the timer of the source 30. The video relayer device 10, after obtaining the BKSV and the R0' value, restarts the timer of the source 30. With this arrangement, authentication can be performed within the time limit set by the timer, making it possible to perform video transmission using HDCP authentication even when the distance between the source 30 and the sink 40 is large.

In addition, according to the first embodiment, the video relayer device 10 in the video transmission system 1, upon receiving the AKSV from the source 30, turns off the hot-plug signal to notify the source 30 of the suspension of the connection to the sink 40 so as to pause the timer of the source 30. When the video relayer device 10 obtains both the BKSV and the R0' value, the video relayer device 10 notifies the source 30 of completion of connection between the source 30 and the sink 40 to restart the timer of the source 30.

In this way, according to the devices according to the first embodiment, even when the distance between a source and a sink is large, authentication between the source and the sink can be performed within the time limit set in the timer. As a result, video transmission using HDCP authentication between the source and the sink can be realized.

While an embodiment of the invention has been described in the foregoing, the invention may be practiced in various different forms. Thus, another embodiment that is encompassed within the invention will be described as a second embodiment.

(1) Multiple Sources

In the first embodiment described above, a single source and a video transmission device for the source are connected by an HDMI cable. However, the present embodiment does not necessarily follow the above configuration, and a plurality of sources and a video transmission device provided at the src-side may be connected by HDMI cables.

Specifically, in a video transmission system according to the second embodiment, a video relayer device 10a at the src-side is connected to a plurality of sources 30A to 30C. In this configuration, when the video relayer device 10a receives a plurality of AKSVs, the video relayer device 10a determines which AKSVs have been transmitted from which sources.

(2) System Configuration

The individual components of the devices described above are conceptually illustrated in the drawings and thus are not necessarily configured physically as illustrated in the drawings. That is, detailed arrangements of distribution and integration in the individual devices are not limited to those illustrated, and all or part of the components are functionally or physically distributed and integrated in arbitrary units in accordance with various loads and states of use. For example, the MPU 13 and the HDCP control unit 15 may be integrated. Further, all or arbitrary part of processing functions performed by the devices can be realized by a CPU and a program analyzed and executed by the CPU, or can be realized as hardware by a wired logic.

Moreover, all or part of the processing according to the above embodiments which has been described as being automatically performed can also be performed manually. Alternatively, all or part of the processing which has been described as being manually performed can also be performed automatically using a known method. In addition, the processing procedure, the control procedure, the specific names, and the information including various data and parameters described above and illustrated in the drawings may be arbitrarily modified unless specifically stated otherwise.

(3) Program

Figure 6:
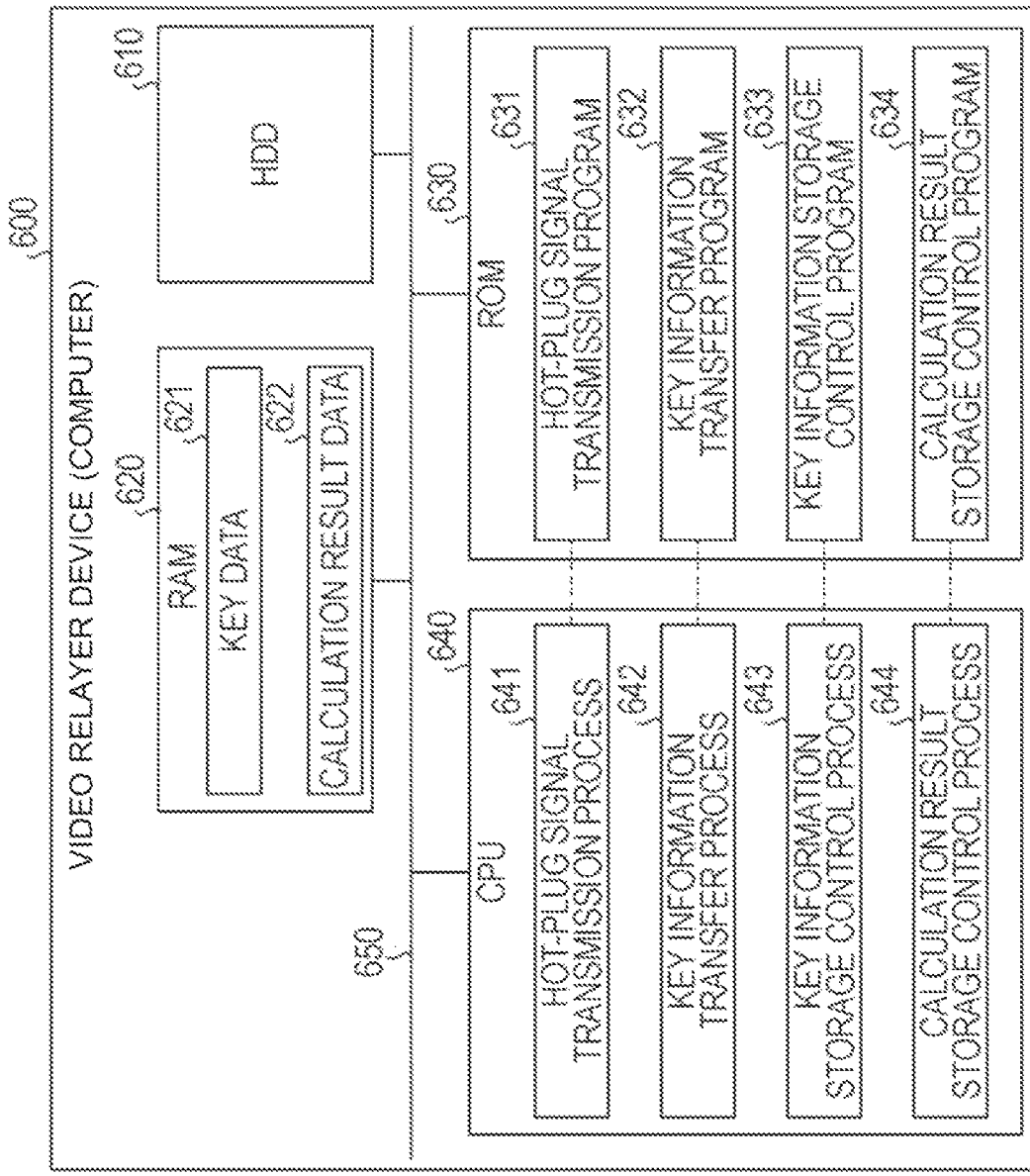
FIG. 6 illustrates another embodiment of the invention in which a computer executes an authentication program.
Figure 7:
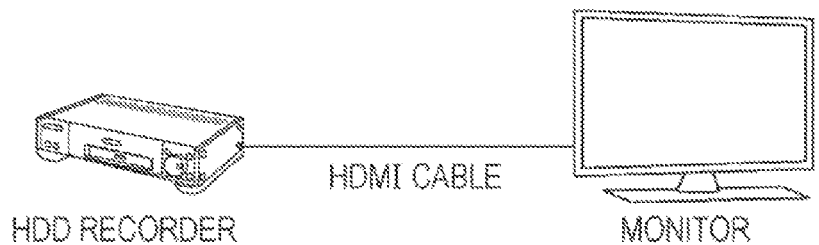
FIG. 7 illustrates a video transmission system according to the Related Art.
Figure 8:
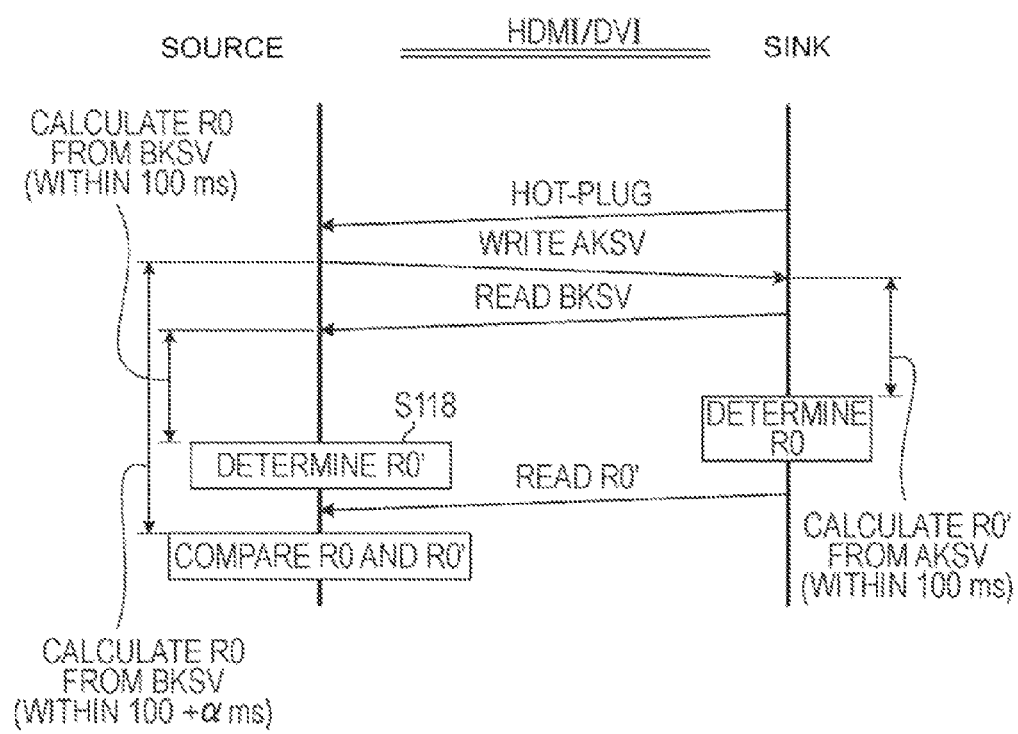
FIG. 8 illustrates a sequence diagram of a procedure of authentication processing performed by a video transmission system according to the Related Art.
Figure 9:
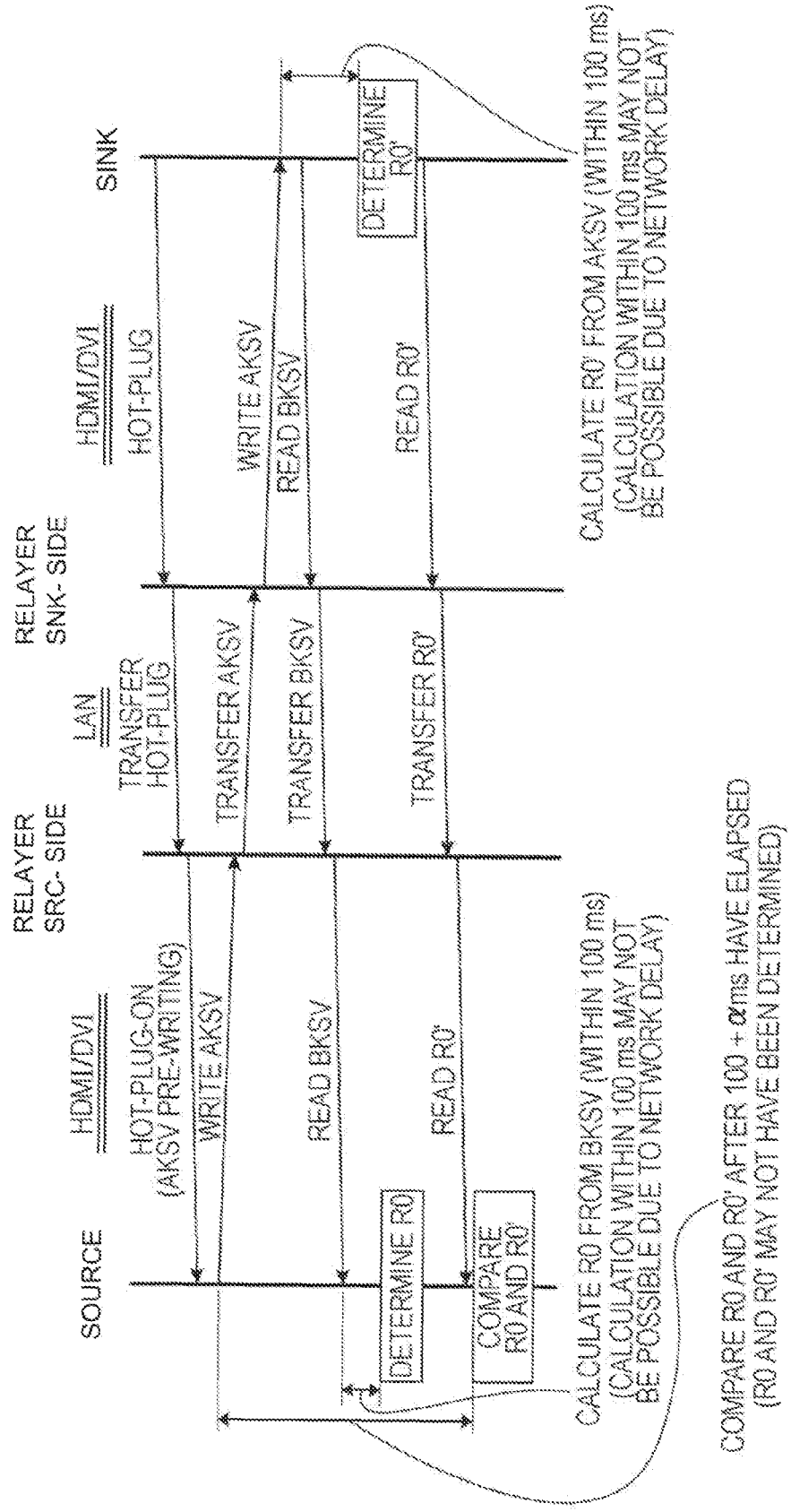
FIG. 9 illustrates another video transmission system according to the Related Art.

The various processing described in the above embodiments may be realized by executing a program prepared in advance using a computer. In the following, referring to FIG. 6, an example of a computer for executing a program having functions similar to the functions of the components described in the above embodiments will be described. FIG. 6 illustrates a computer for executing an authentication program.

As illustrated in FIG. 6, a computer 600 serving as a video relayer device has an HDD (hard disk) 610, a RAM (random access memory) 620, a ROM (read-only memory) 630, and a CPU (central processing unit) 640 which are connected through a bus 650.

The ROM 630 pre-stores an authentication program that exerts the functions similar to the functions of the components described in the above embodiments. That is, as illustrated in FIG. 6, a hot-plug signal transmission program 631, a key information transfer program 632, a key information storage control program 633, and a calculation result storage control program 634 are stored in advance in the ROM 630. It is possible to distribute and integrate the programs 631 to 634 according to need, as in the case of the components illustrated in FIG. 2.

The CPU 640 reads out these programs 631 to 634 from the ROM 630 and executes the programs 631 to 634, so that the programs 631 to 634 function as a hot-plug signal transmission process 641, a key information transfer process 642, a key information storage control process 643, and a calculation result storage control process 644, respectively. The processes 641 to 644 correspond to the hot-plug signal transmission section 15a, the key information transfer section 15b, the key information storage control section 15c, and the calculation result storage control section 15d, respectively, which are illustrated in FIG. 2.

Then, the CPU 640 executes processing on the basis of key data 621 and a calculation result 622 stored in the RAM 620.

Such programs may be stored in other computer-readable storage medium such as a hard disk, a flexible disk, compact disc ROM (CD-ROM), magneto-optical (MO) disk, and digital versatile disk (DVD), and executed by a computer. The program may be transmission medium distributable through a network such as the Internet.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A video transmission system including a video content source that has a timer, a video content sink, and video relayer devices, at least one of the video relayer devices comprising:
   a processing unit;
   a memory to store a calculation result and second key information, the calculation result being produced by the video content sink based upon first key information, and the second key information being associated with a second key held by the video content sink;
   the processing unit being configured to include, a key information transfer section to transfer first key information to the video content sink upon receiving the first key information from the video content source, the first key information being associated with a first key held by the video content source;
   a timer pausing section to control the timer of the video content source to pause upon receiving the first key information from the video content source;
   the processing unit being operable to receive the second key information and the calculation result from the video content sink and store the second key information and the calculation result, respectively, in the memory; and
   the processing unit being further configured to include, a timer resuming section to control the timer of the video content source to resume when the second key information and the calculation result have been stored, respectively, in the memory,
   wherein upon receiving the first key information from the video content source, the timer pausing section is further operable to notify the video content source that the video content source and the video content sink are not connected and to control the timer of the video content source to pause by turning off a hot-plug signal, and
   wherein, when the second key information and the calculation result have been stored in the memory, respectively, the timer resuming section is further operable to notify the video content source that the video content source and the video content sink are connected and to control the timer of the video content source to resume by transmitting a hot-plug signal.

2. A non-transitory computer-readable medium comprising computer-executable instructions for performing a method, execution of which by the computer facilitates video transmission in circumstances of a video transmission system including a video content source that has a timer, a video content sink and a video relayer devices, the method including:

- transferring by the video relayer device, first key information to the video content sink upon receiving the first key information from the video content source;
- receiving second key information from the video content sink and storing the second key information, the second key information being associated with a key held by the video content sink;
- pausing the timer of the video content source upon receiving the first key information from the video content source;
- receiving a calculation result from the video content sink and storing the calculation result, the calculation result being a value produced by the video content sink based upon the first key information; and
- controlling the timer of the video content source to resume when the second key information and the calculation result have been stored, respectively;
- wherein pausing operation of the timer of the video content source includes turning off a hot-plug signal which indicates to the video content source that the video content source and the video content sink are not connected, and
- wherein resuming operation of the timer of the video content source is resumed by transmitting a hot-plug signal to the video content source which indicates to the video content source that the video content source and the video content sink are connected.

3. A video relayer device comprising:
- a processing unit;
- a memory to store a calculation result and second key information, the calculation result being produced by an external video content sink based upon first key information, and the first key information being associated with a first key held by an external video content source; and
- the processing unit being configured to include,
  - a key information transfer section to transfer first key information to the external video content sink upon receiving the first key information from the external video content source, and
  - a timer pausing section to control a timer of the external video content source to pause upon receiving the first key information from the external video content source;
- the processing unit being operable to receive second key information and a calculation result from the external video content sink and store the second key information and the calculation result, respectively, in the memory; and
- the processing unit being further configured to include,
  - a timer resuming section to control the timer of the external video content source to resume when the second key information and the calculation result have been stored, respectively, in the memory,
- wherein the timer pausing section to control the timer of the external video content source includes turning off a hot-plug signal which indicates to the external video content source that the external video content source and the external video content sink are not connected, and
- wherein the timer resuming section to control the timer of the external video content source to resume by transmitting a hot-plug signal to the external video content source which indicates to the external video content source that the external video content source and the external video content sink are connected.

* * * * *